(12) United States Patent
Dupuis et al.

(10) Patent No.: US 10,141,700 B2
(45) Date of Patent: Nov. 27, 2018

(54) INTEGRATED MODULAR MULTIMEDIA SYSTEM IN WALL-BOX FORMAT

(71) Applicant: Hubbell Incorporated, Shelton, CT (US)

(72) Inventors: Joseph E Dupuis, Ledyard, RI (US); Douglas P O'Connor, Richmond, RI (US); Glenn Thomas Kierstead, Orlando, FL (US); Shadi Alex AbuGhazaleh, Guilford, CT (US)

(73) Assignee: Hubbell Incorporated, Shelton, CT (US)

( * ) Notice: Subject to any disclaimer, the term of this patent is extended or adjusted under 35 U.S.C. 154(b) by 78 days.

(21) Appl. No.: 14/706,720

(22) Filed: May 7, 2015

(65) Prior Publication Data

US 2016/0006202 A1    Jan. 7, 2016

Related U.S. Application Data

(60) Provisional application No. 61/989,703, filed on May 7, 2014.

(51) Int. Cl.
| | |
|---|---|
| *H01R 27/02* | (2006.01) |
| *H01R 33/90* | (2006.01) |
| *H02M 7/04* | (2006.01) |
| *H01R 13/66* | (2006.01) |
| *H01R 24/78* | (2011.01) |

(52) U.S. Cl.
CPC ............ *H01R 27/02* (2013.01); *H01R 33/90* (2013.01); *H02M 7/04* (2013.01); *H01R 13/6675* (2013.01); *H01R 24/78* (2013.01)

(58) Field of Classification Search
CPC ....................................... H01R 27/02
See application file for complete search history.

(56) References Cited

U.S. PATENT DOCUMENTS

| | | | | |
|---|---|---|---|---|
| 4,270,020 A * | 5/1981 | Kenworthy | .......... | H01R 25/162 174/497 |
| 5,122,069 A * | 6/1992 | Brownlie | ............. | G02B 6/4451 174/53 |
| 5,885,109 A * | 3/1999 | Lee | ....... | H01R 13/514 439/131 |
| 7,192,289 B2 * | 3/2007 | Kowalski | ................. | H02G 3/00 439/106 |
| 9,252,610 B2 * | 2/2016 | Chen | ..................... | H02J 7/0042 |
| 9,635,773 B1 * | 4/2017 | Marshall | ................ | H01R 13/70 |
| 2002/0194383 A1 * | 12/2002 | Cohen | .................... | H01R 27/02 709/249 |
| 2004/0121648 A1 * | 6/2004 | Voros | ................. | H01R 13/6215 439/535 |
| 2004/0218411 A1 | 11/2004 | Luu et al. | | |
| 2005/0170678 A1 * | 8/2005 | Donahue, IV | ....... | H01R 13/514 439/214 |
| 2005/0176275 A1 * | 8/2005 | Hoopes | ............. | H01R 13/6276 439/76.1 |

(Continued)

*Primary Examiner* — James Harvey
(74) *Attorney, Agent, or Firm* — Dickinson Wright, PLLC

(57) ABSTRACT

An electrical module provides a plug receptacle for AC power and also converts AC power into DC power and provides DC output. The module may also provide one or more multimedia connectors. DC power may be provided from one module to another such that a single DC power supply may supply DC power for multiple modules.

16 Claims, 15 Drawing Sheets

(56) References Cited

U.S. PATENT DOCUMENTS

| | | | |
|---|---|---|---|
| 2008/0160826 A1* | 7/2008 | Lamoureux | H01R 27/02 439/535 |
| 2009/0029576 A1* | 1/2009 | Shunjie | H01R 13/44 439/131 |
| 2010/0302755 A1* | 12/2010 | Mazzullo | H01R 35/04 361/810 |
| 2011/0215759 A1* | 9/2011 | Lee | G06F 1/266 320/115 |
| 2012/0014049 A1* | 1/2012 | Ogle | H05K 5/0278 361/679.01 |
| 2012/0292991 A1 | 11/2012 | Dodal et al. | |
| 2013/0058012 A1* | 3/2013 | Ballard | H02G 3/18 361/622 |
| 2013/0280956 A1 | 10/2013 | Cheng et al. | |
| 2014/0104805 A1* | 4/2014 | Row | H01R 13/516 361/807 |
| 2014/0350701 A1* | 11/2014 | Underwood | H01R 9/2408 700/83 |
| 2015/0263447 A1* | 9/2015 | Liao | H01R 31/065 361/601 |
| 2016/0006202 A1* | 1/2016 | Dupuis | H01R 33/90 439/540.1 |
| 2016/0111878 A1* | 4/2016 | Qureshi | H04R 27/00 307/39 |
| 2016/0329673 A1* | 11/2016 | McCormick | H02H 9/005 |
| 2017/0018896 A1* | 1/2017 | Mortun | H01R 4/30 |
| 2017/0063008 A1* | 3/2017 | Goyal | H01R 27/02 |

* cited by examiner

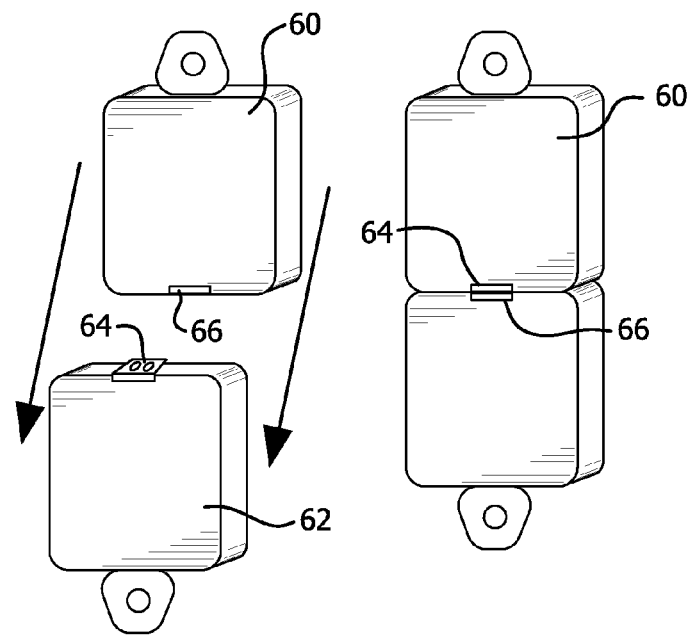
FIG. 6
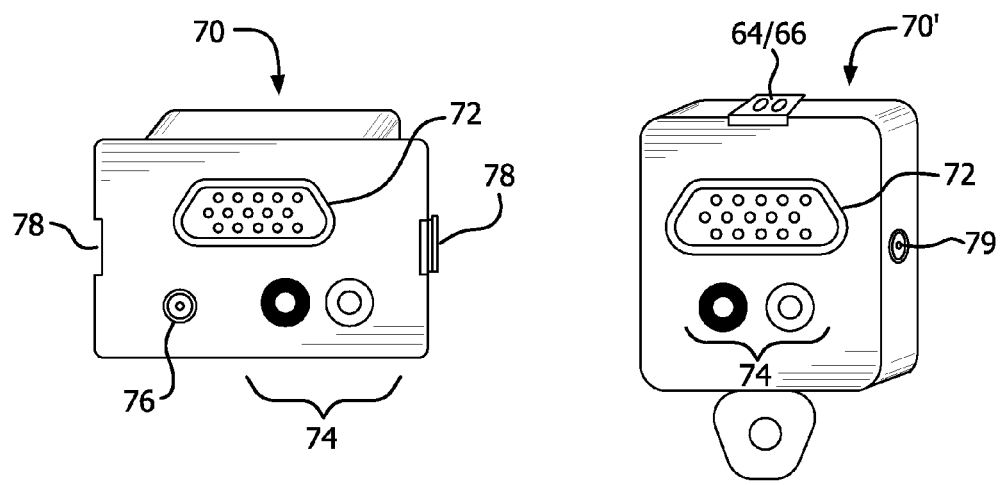
FIG. 7A
FIG. 7B

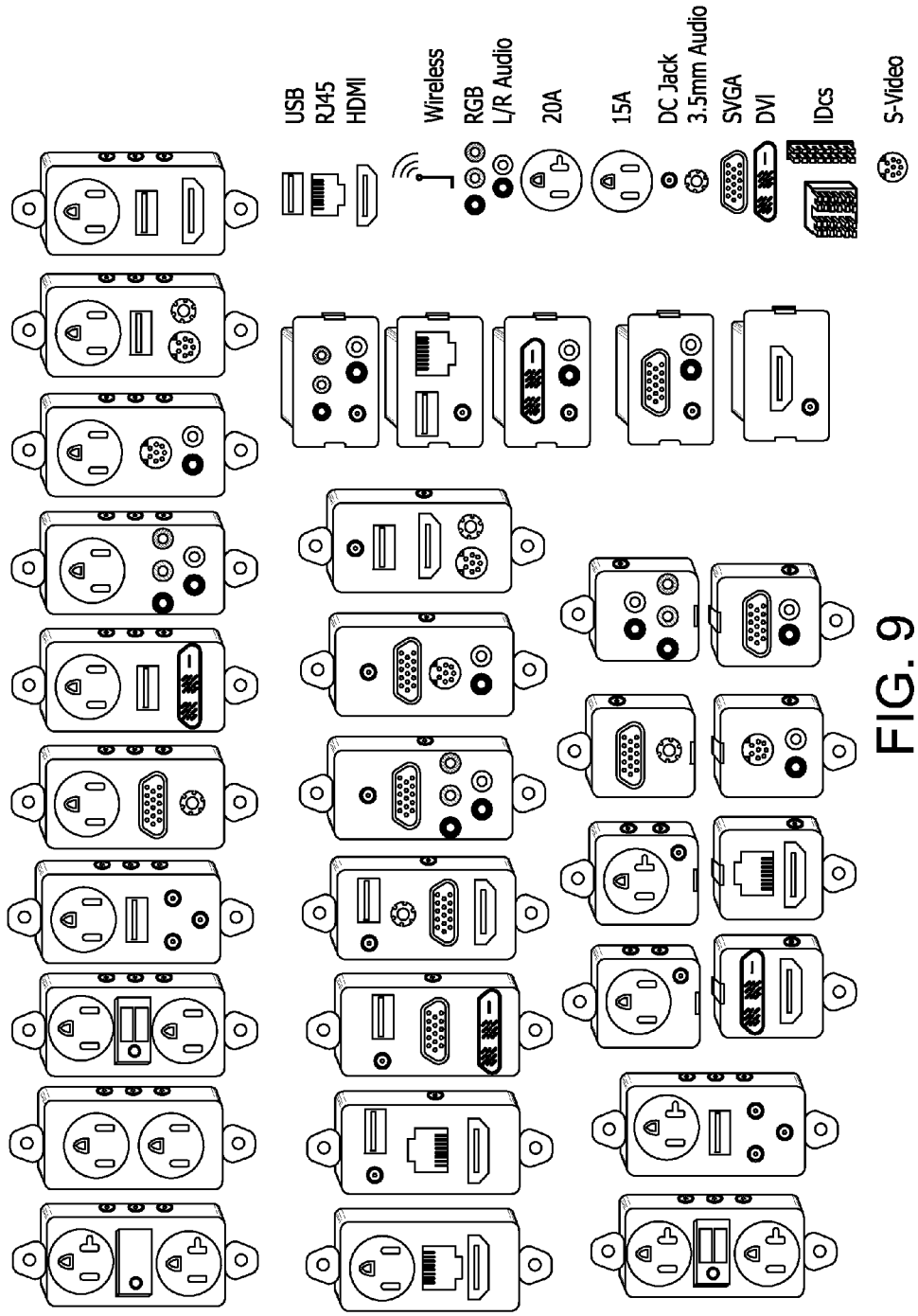

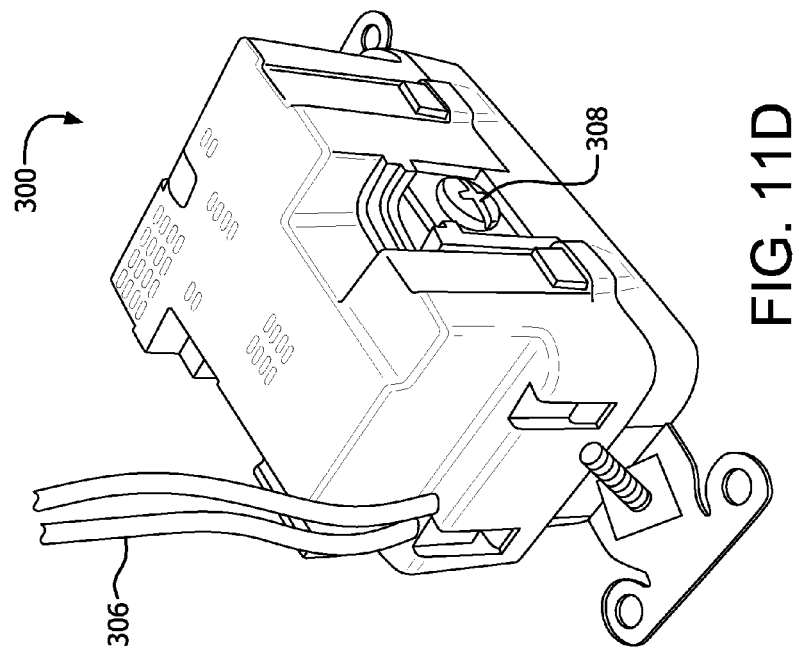
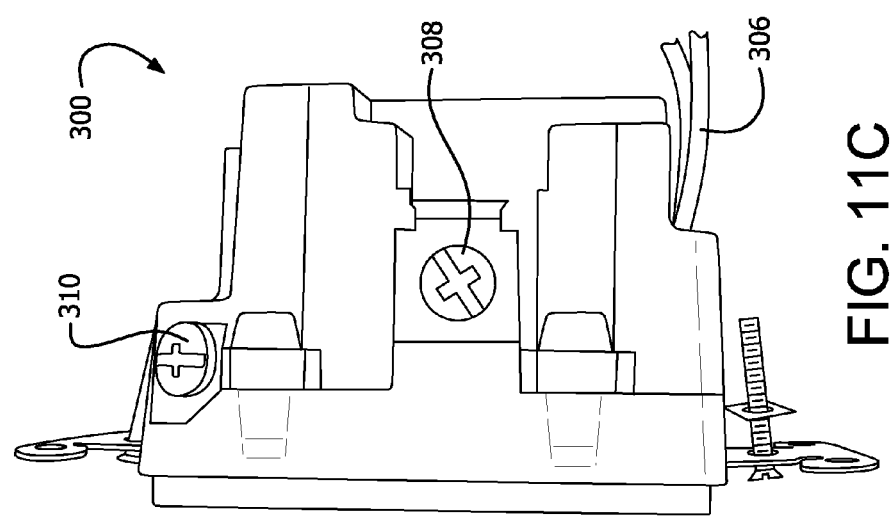

INTEGRATED MODULAR MULTIMEDIA SYSTEM IN WALL-BOX FORMAT

RELATED APPLICATIONS

This application claims the benefit under 35 U.S.C. § 119(e) of U.S. Provisional Patent Application No. 61/989,783 filed May 7, 2014, the entire contents of which are hereby incorporated by reference.

FIELD OF THE INVENTION

The invention relates to low-voltage communications applications, such as video, audio and Ethernet, integrated into modules that consolidate, convert and then transmit signals over balanced twisted pair cabling.

BACKGROUND

Active audio and video transmitters and receivers are quite common. The devices that amplify, repeat or correct the transmitted signal typically take the form of adapters or modules that take up space and require separate electrical input from an AC/DC converter module. This form factor is not desirable for aesthetic and, in particular, security reasons, especially when installed in areas or buildings with uncontrolled access, such as auditoriums and conference rooms in schools, universities, and hotels. Furthermore, existing multimedia implementations vary widely by utilizing non-standard enclosures, multi-gang footprints and special faceplates.

SUMMARY OF THE INVENTION

The invention encompasses a collection of devices, their variants and supporting peripherals in several form factors and combinations that constitute a modular multimedia system well-suited to be an integral part of infrastructure. The system is intended to support point-to-point implementations of audio, video and data applications between two devices. The devices are mainly, but not exclusively intended to support the transmission of digital audio, video and multimedia (data) signals (analog or digital) over balanced twisted pair cabling. The system preferably accomplishes standardization by integrating the devices into modular system components, such as modules, frames, and plates sized to fit standard, typically single-gang electrical boxes, telecom boxes and enclosure mounting systems including box eliminators, trimmed and/or supported behind a standard wall plate. The system preferably and advantageously eliminates the need for an external AC/DC converter. This conserves valuable space on the receptacle face by combining in the same module an AC outlet with a DC converter such as a class 2 DC power supply, appropriately isolated for safety. The low voltage side of the module can also contain multimedia devices as described herein. In exemplary embodiments of the present invention, a DC input may be provided in the front of the device for certain applications. A preferred embodiment incorporates a DC converter inside the enclosure, includes an isolation barrier between high voltage and low voltage compartments, and includes proper fitting and a low voltage connection between compartments.

Embodiments of the present invention preferably support multiple multimedia formats, including but not limited to Ethernet, USB, VGA, HDMI, DisplayPort, serial and infrared receiver.

Embodiments of the present invention enable extended distance operation over twisted pair cabling and other media cables by incorporating signal processing and connectivity components in the module(s) to provide necessary equalization, signal conditioning, amplification, phase correction, multiplexing and other functions.

The individual functional unit is a data, audio and video module. Each unit is effectively a media converter that consolidates various media inputs through the face into a digital format and communicates these signals to a receiver unit on the other end of the balanced twisted pair cable. Embodiments of the invention are preferably able to combine such media as Ethernet, HDMI, USB, Infrared remote signal, DisplayPort, and so on an any reasonable combination. As will be appreciated, any low voltage signal and associated connection form factor from a multimedia device may be implemented.

One embodiment of the present invention is a source module intended for use with an A/V source, such as a Bluray player or a PC. Another embodiment of the present invention is a display unit intended for use with an A/V display, such as a TV or monitor. The source module handles all conversion from various analog and digital signals to a desired digital signal for transmission over a desired protocol such as Ethernet or HDBASE-T. The display unit converts the transmitted signal back to various media types, such as USB, IR and video. In a preferred embodiment, the display unit outputs the video signal in HDMI format so that a TV, monitor or projector only needs a single input regardless of the format of the input source signal (e.g. VGA, HDMI, component, etc.). Image signals flow from source unit to display unit, while other data communication flows in both directions between the modules. The embodiments described above do not exclude additional outputs being present at the display unit such as separate audio, serial or video.

A first module form factor according to an embodiment of the invention includes an AC/DC power module having an AC quick-connect socket in the rear, an AC outlet on the face and an internal AC/DC converter powering DC outlets on the face, side and rear. A second module form factor according to another embodiment of the invention includes a DC-powered AV module fed by an external DC power source from the rear and having DC outlets on the face and side, audio and video connectors on the face, and network cable interfaces on the rear.

A third form factor according to an embodiment of the invention includes an AC-powered AV module having an AC quick-connect socket in the rear, an AC outlet on the face, an internal AC/DC converter, audio and video connectors on the face, and a network cable interface on the rear.

A fourth form factor according to an embodiment of the invention includes a set of half modules with mating couplings (such as tongue-and-groove couplings) that enable the half-modules to be joined to create a full-size assembly having a desired combination of jacks.

Other module features include, but are not limited to, interchangeable faces, multiple circuit boards, switched 5V DC power, constant 5V DC power, and snap-on covers that insulate the 120V AC screw terminals. Interchangeable faces preferably work with a common back end of an enclosure which holds the electronics, and which accepts any of the module mounting faces that preferably snap into the common back end. Modules may include multiple circuit boards that are sandwiched or stacked within the enclosure and electrically joined using board-to-board connections. The modules may include switched 5V DC power, and preferably have a USB charging port on the face of the module that is controlled by an on/off switch with a status indicator lamp. The modules may also include constant (unswitched) 5V DC power. Such a module can include power leads or conductors exiting the rear of the enclosure to feed low-voltage devices in the same or an adjacent compartment.

BRIEF DESCRIPTION OF THE DRAWING FIGURES

Various embodiments of the disclosed invention are described below, purely by way of example, with reference to the accompanying drawings, in which.

Figure 1A:
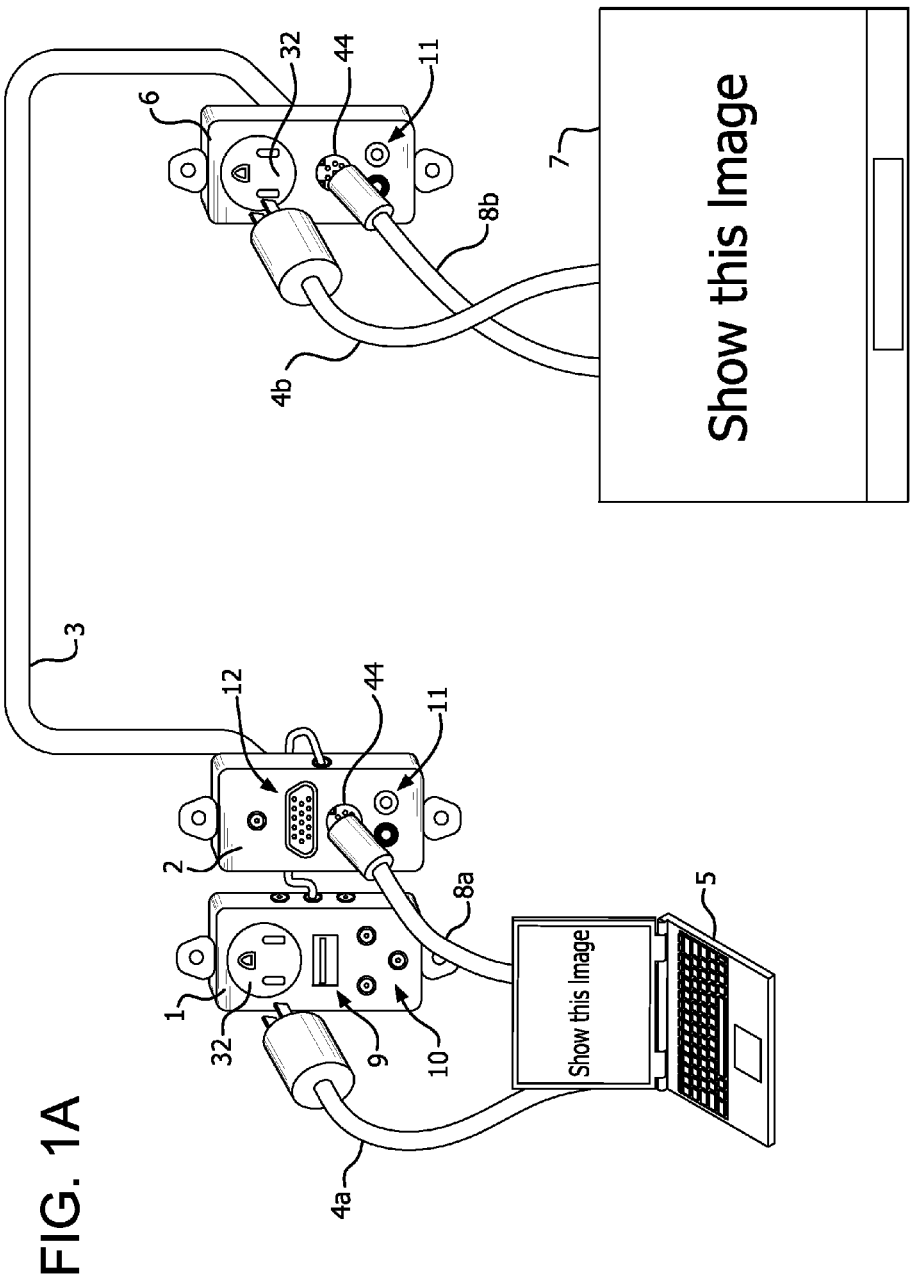
FIG. 1A is a schematic illustration of an active AV system employing several examples of modules according to the invention.
Figure 4:
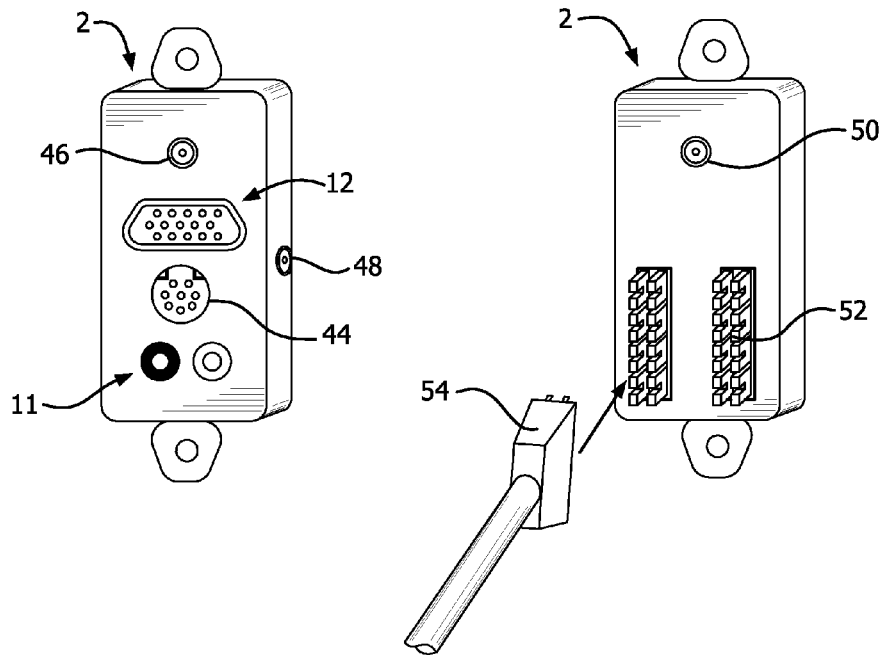
Figure 5:
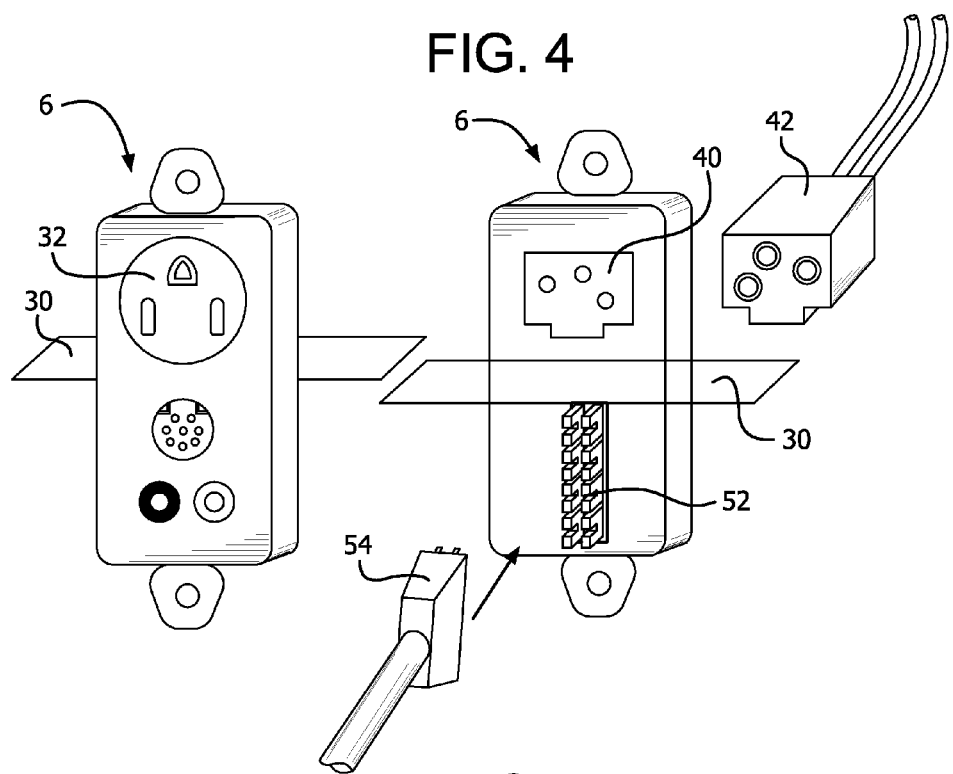
Figure 8:
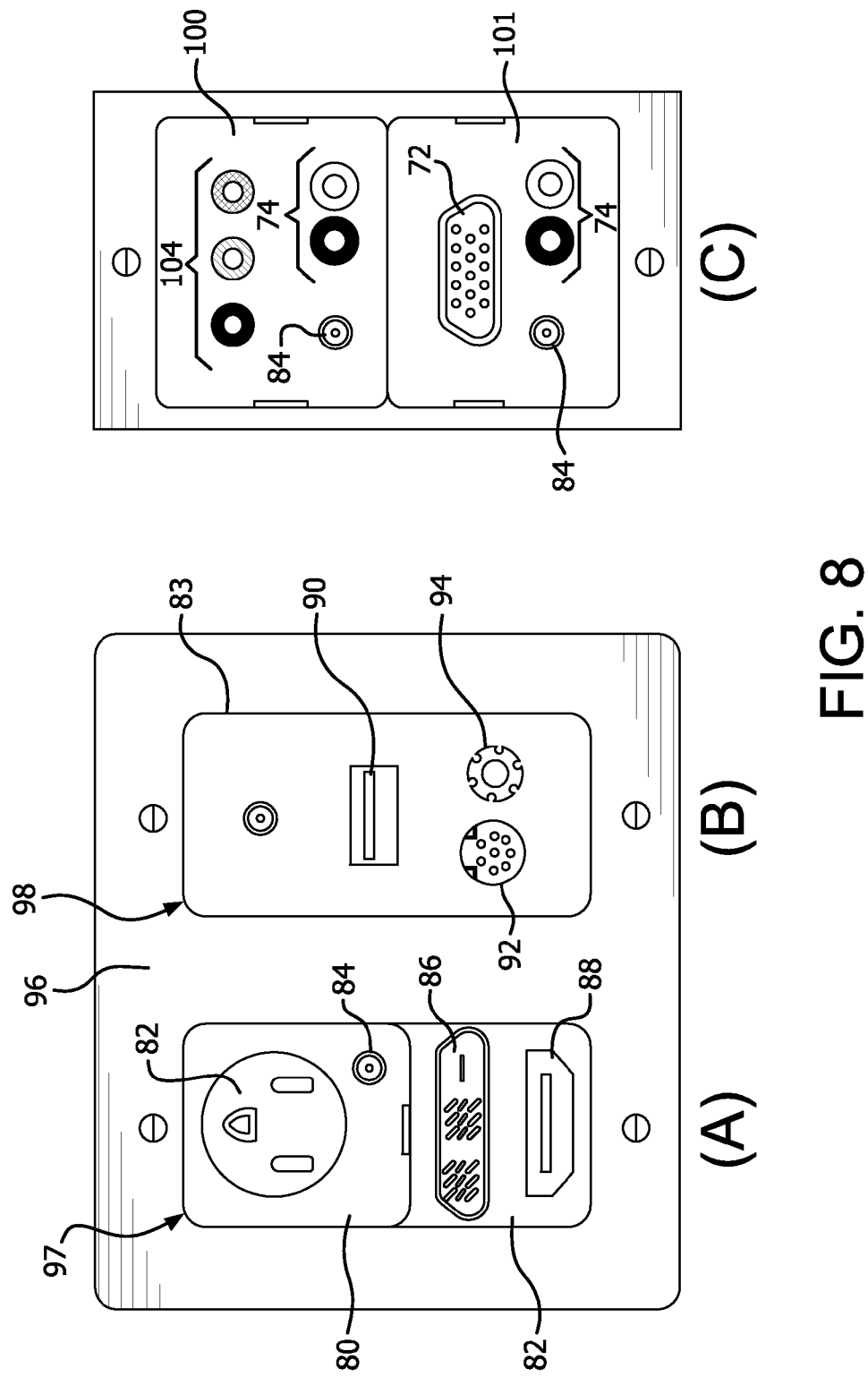
Figure 10B:
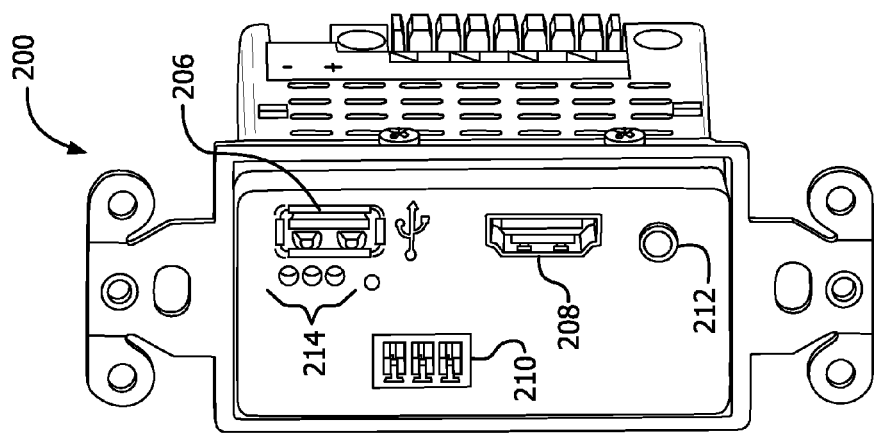
Figure 10A:
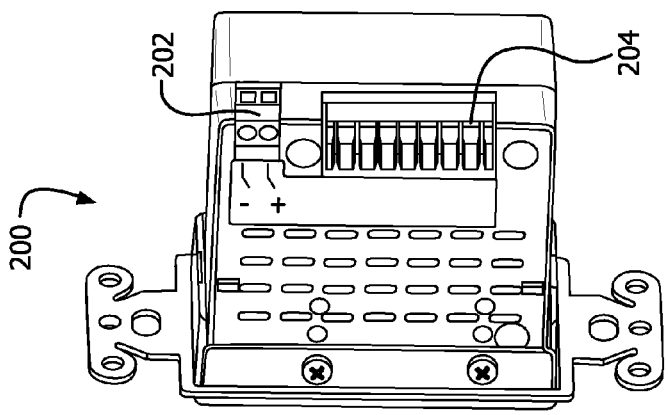
Figure 10C:
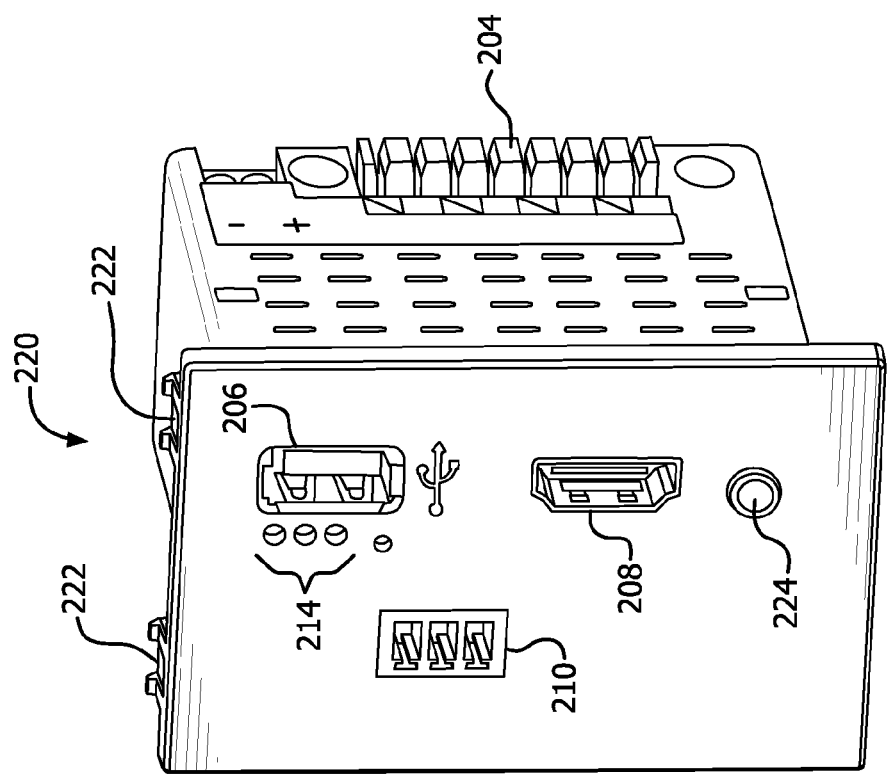
Figure 11B:
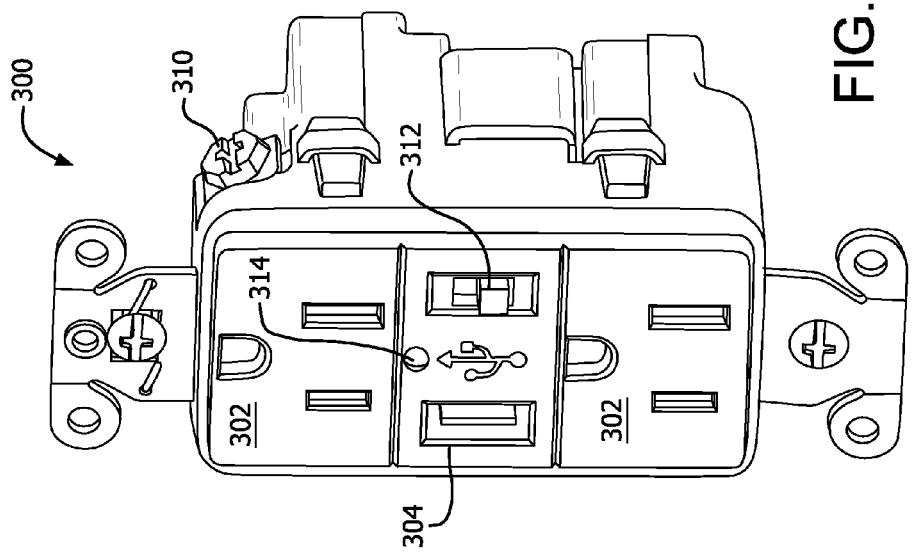
Figure 11A:
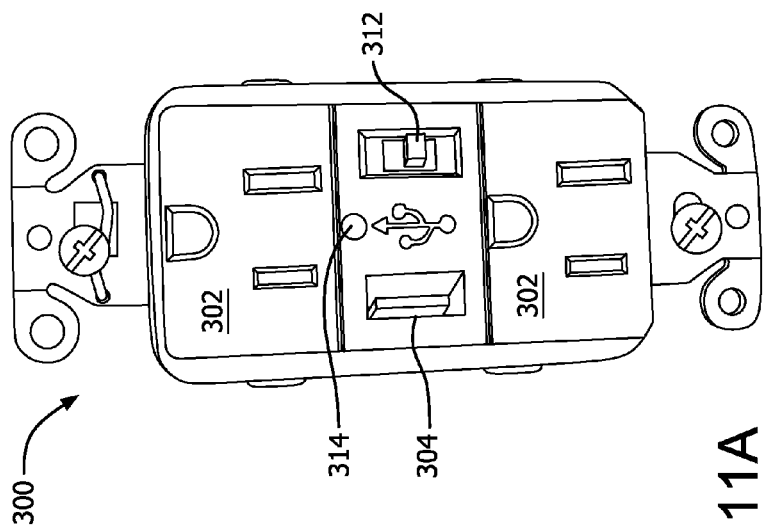
Figure 12:
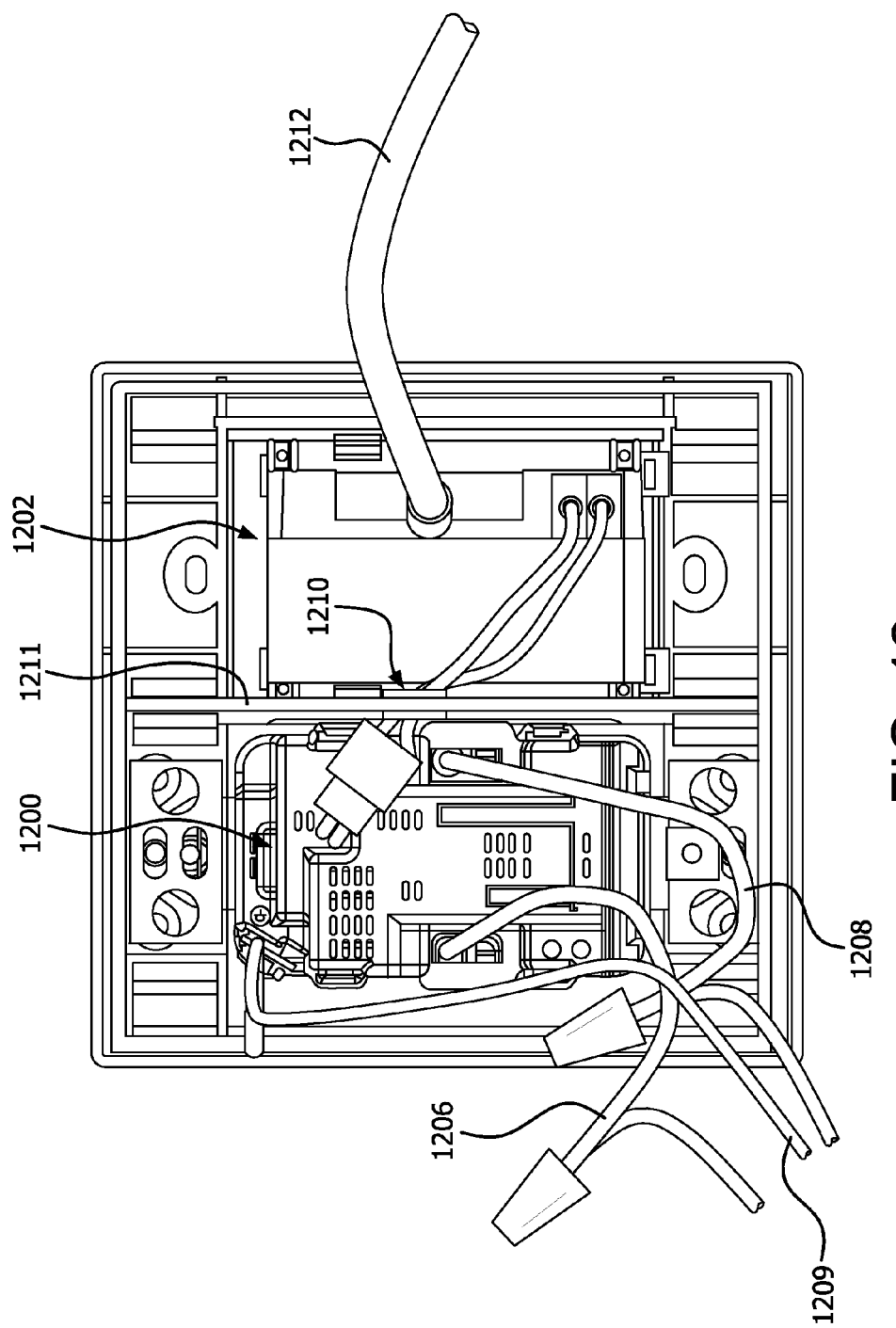
Figure 13:
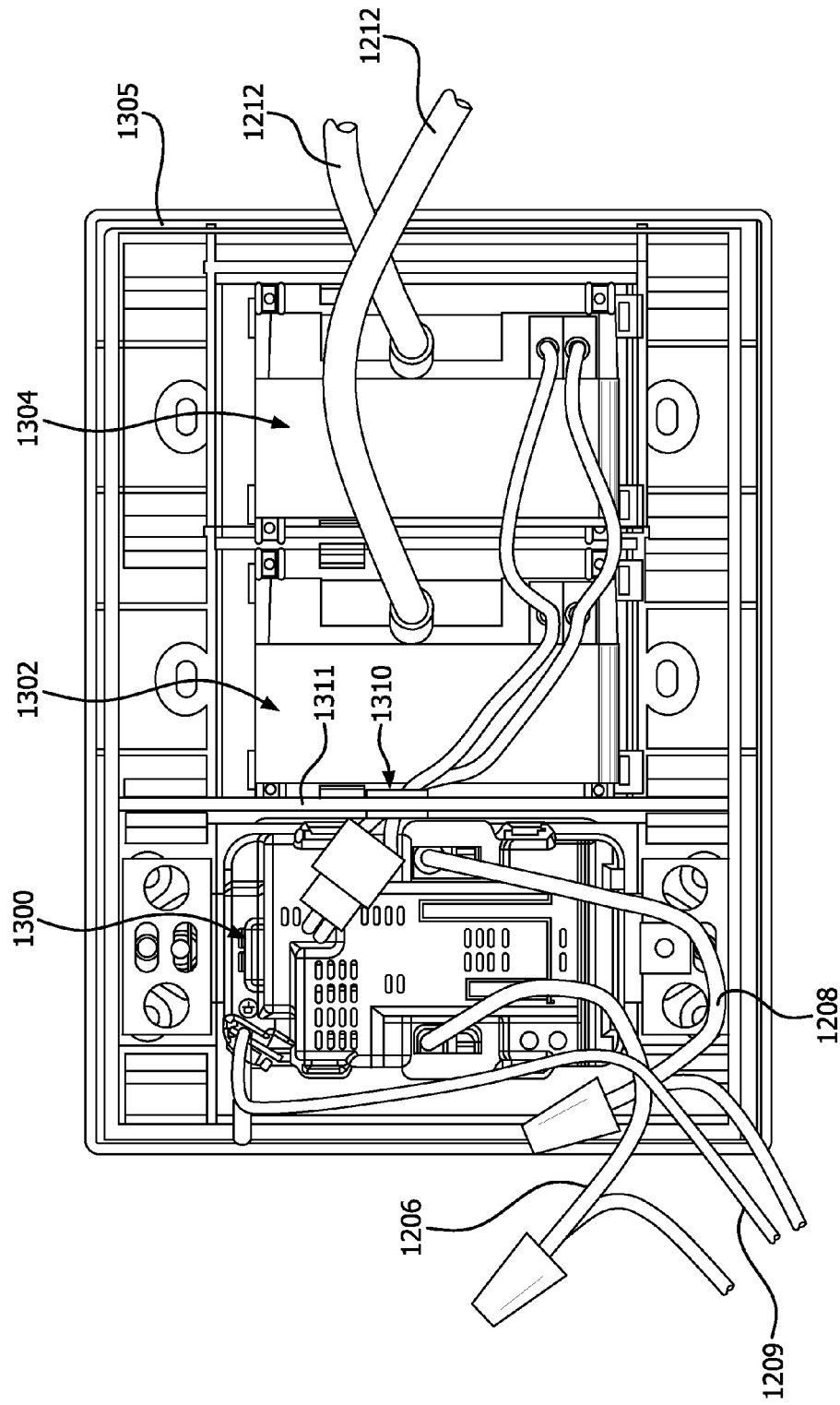
Figure 14:
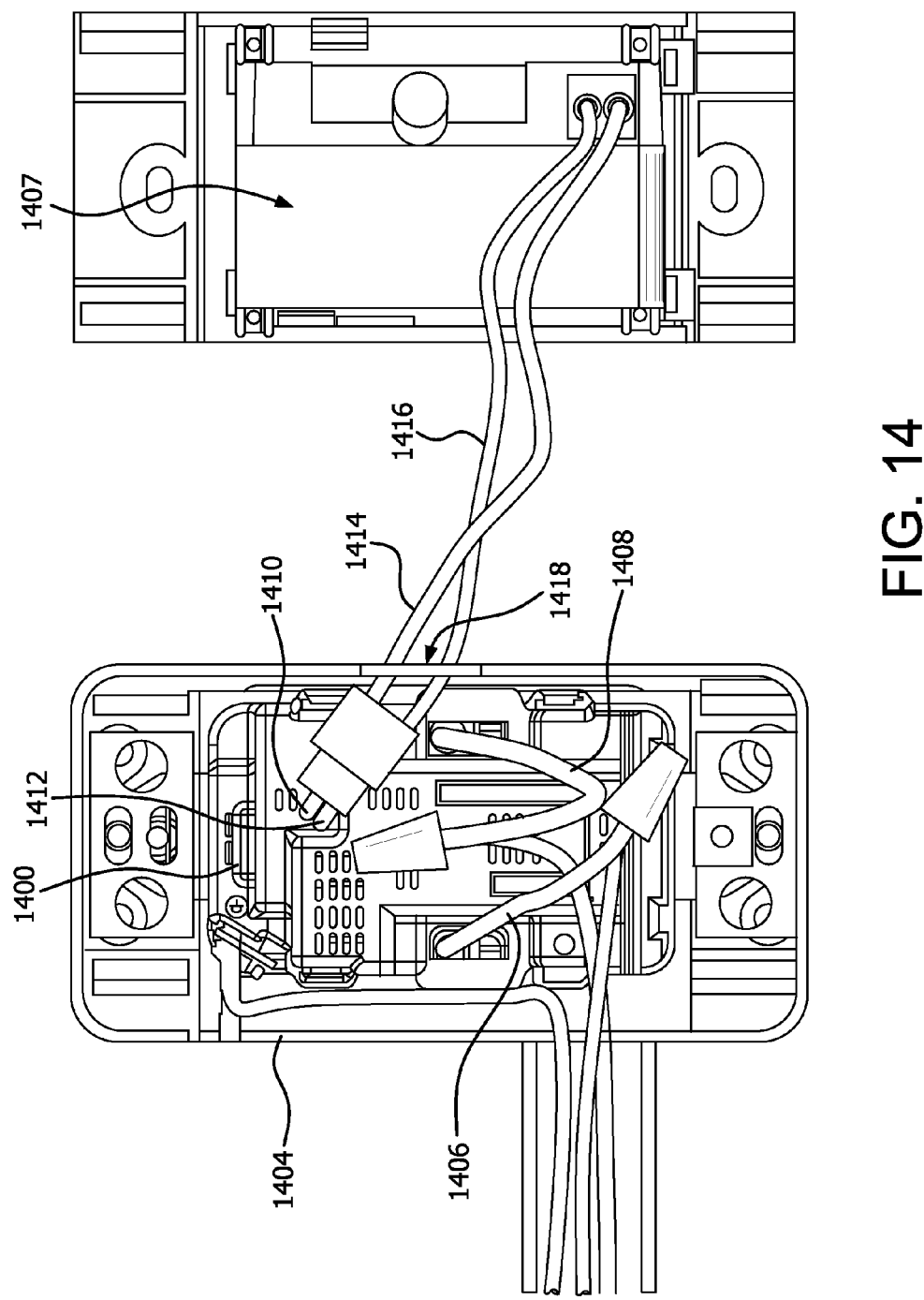
Figure 15:
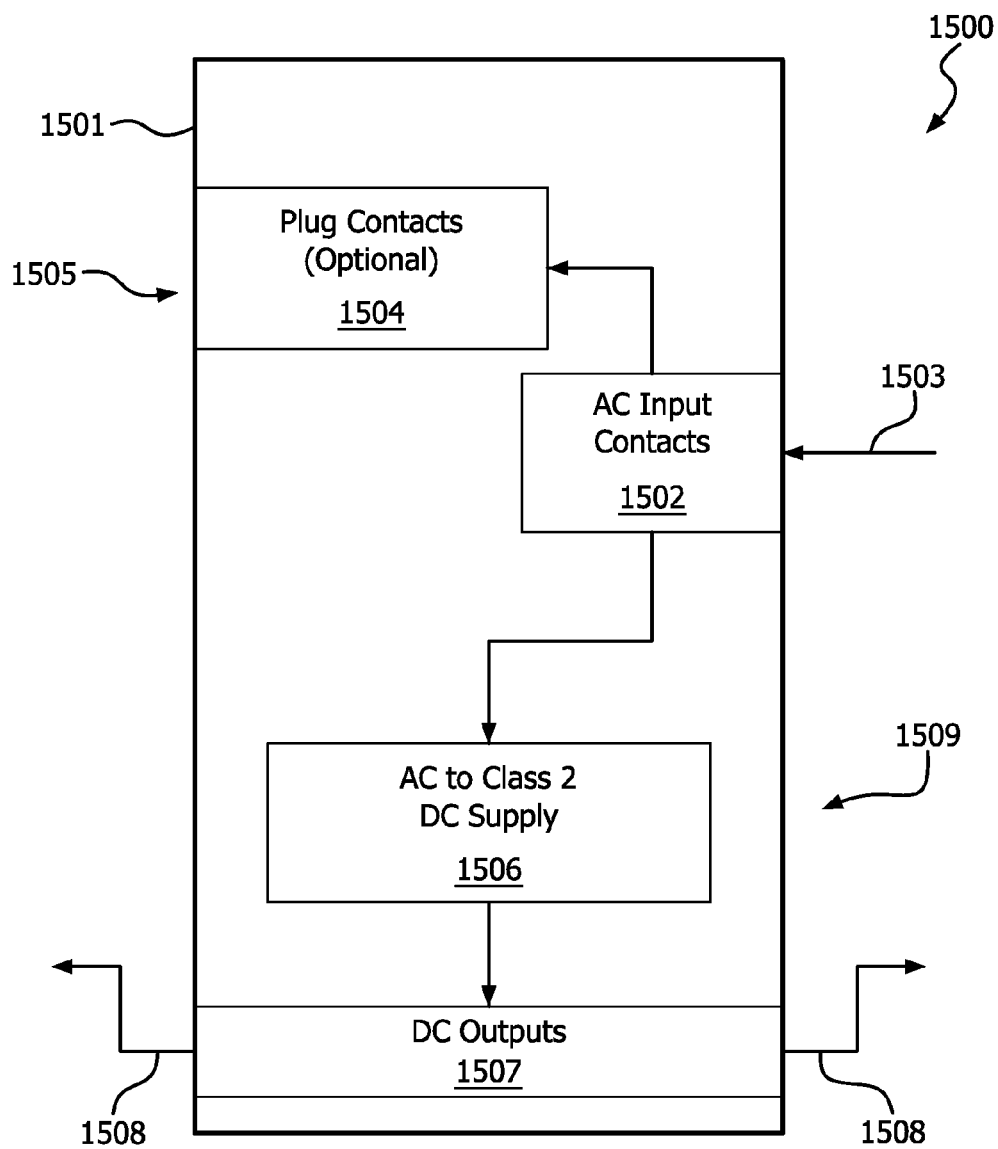

FIG. 4 consists of front and rear perspective views of the AV module shown in FIG. 1A, which has a rear low voltage DC input;

FIG. 5 consists of front and rear perspective views of the AV module shown in FIG. 1A, which has an AC outlet and an internal DC power source;

FIG. 6 is a schematic illustration of how connecting half modules according to an embodiment of the invention can create desired configurations;

FIGS. 7A and 7B consist of front perspective views of VGA and audio half modules according to an embodiment of the invention;

FIG. 8 consists of front elevational views of examples of configurations made up of half modules (a), a full module (b) and an "Infini-Module" (c) according to an embodiment of the invention;

FIG. 9 consists of front perspective views of additional examples of full modules and half modules according to an embodiment of the invention;

FIG. 10A is a rear perspective view of another embodiment of a digital AV module according to an embodiment of the invention;

FIG. 10B is a front perspective view of the module of FIG. 10a in a decorator frame surround;

FIG. 10C is a front perspective view of another embodiment of a digital AV module with a snap-in face;

FIGS. 11A and 11B are front elevational and front perspective views, respectively, of another embodiment of power module according to an embodiment of the invention;

FIGS. 11C and 11D are side elevational and rear perspective views, respectively, of the power module of FIGS. 11A and 11B;

FIG. 12 is a rear elevational view of a two-module installation according to an embodiment of the invention;

FIG. 13 is a rear elevational view of three-module installation according to an embodiment of the invention;

FIG. 14 is a rear elevational view of two modules according to an embodiment of the invention, one installed in an electrical box and the other installed outside the electrical box; and FIG. 15 is a block diagram of a module including a DC power supply according to an embodiment of the invention.

Throughout the drawings, like reference numbers should be understood to refer to like elements, features and structures.

DETAILED DESCRIPTION OF THE INVENTION

Figure 1B:
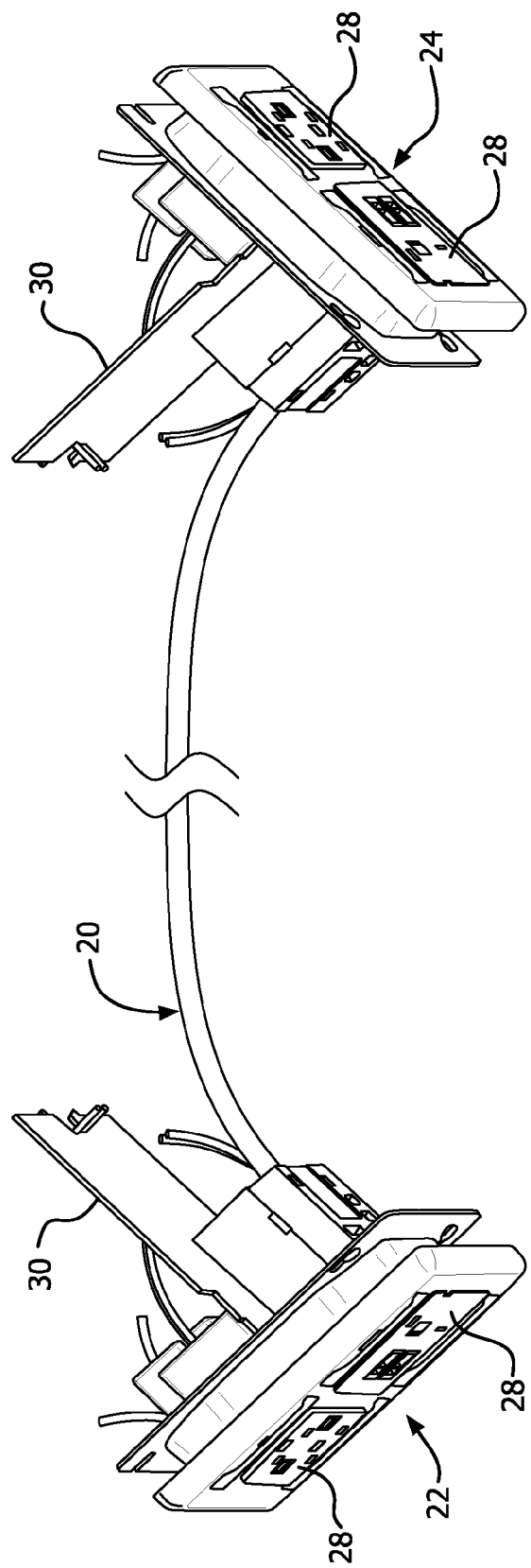
FIG. 1B is a schematic illustration of module connectivity.

FIG. 1A provides a system level view of one embodiment of the invention. The system includes three modules 1, 2 and 6, an AV Source 5, an AV sink (display) 7, and connecting cables and wires 3, 4a, 4b, 8a and 8b. The balanced twisted pair cable 3 is normally installed as part of the infrastructure. Cables 4a and 4b are power cables for providing AC power to the AV source 5 and the AV display 7, respectively. Power cables 4a and 4b are plugged into AC outlets provides in modules 1 and 6. Low voltage signals are provided via cables 8a, 8b. In the embodiment illustrates cables 8a and 8b are S-Video cables. Cable 8a provides an S-Video connection and signal from the AV source 5, and cable 8b provides an S-Video connection and signal to AV display 7. Module 1 also provides a low voltage USB port 9, and low voltage DC connections 10. Module 2 includes audio connectors 11 and an RGB video connection 12. As also illustrated, a low voltage connection 13 is provided between modules 1 and 2 inside of a wall, or the like. That is, the low voltage connection is hidden. The modules 1 and 2 are preferably installed close to one another, such that an AC/DC power converter within module 1 may provide DC power to the low voltage components of both modules 1 and 2. Module 6 is typically installed remotely from either of modules 1 or 2, and a balanced twisted pair cable 3 is provided to deliver communication signals, typically digital signals, over a long distance such as up to about 100 m between module 6 and module 2. FIG. 1b further illustrates a twisted pair connection 20 between modules 22, 24. As also shown, the modules 22, 24 each include an AC outlet 26 and a low voltage communications connection 28. In the illustrated embodiment the low voltage communications connections 28 are USB ports, however, embodiments of the invention could utilize any suitable low voltage communications connection. As also illustrated the modules 22, 24 include isolation barriers 30 to isolate high voltage AC signals from low voltage DC signals. It should be appreciated that isolation barriers may be provided within a single module, as illustrated in FIG. 1b, or may be formed by portions of the housing of a module to isolate one module from another, such as in between modules 1, which includes both high voltage AC and low voltage DC components, and module 2, which includes only low voltage DC components.

Figure 2:
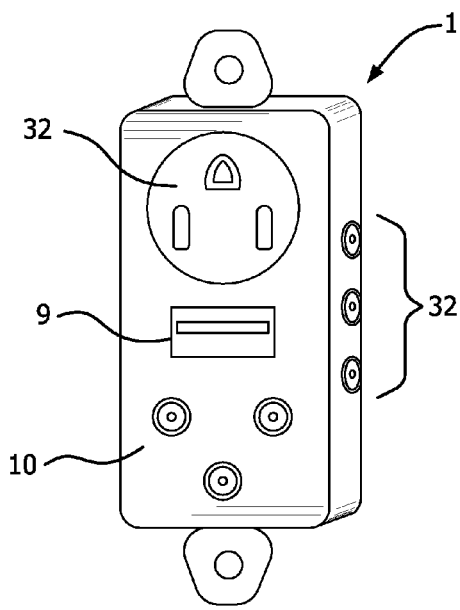
FIG. 2 is a front perspective view of the AC/DC power module shown in FIG. 1A.
Figure 3:
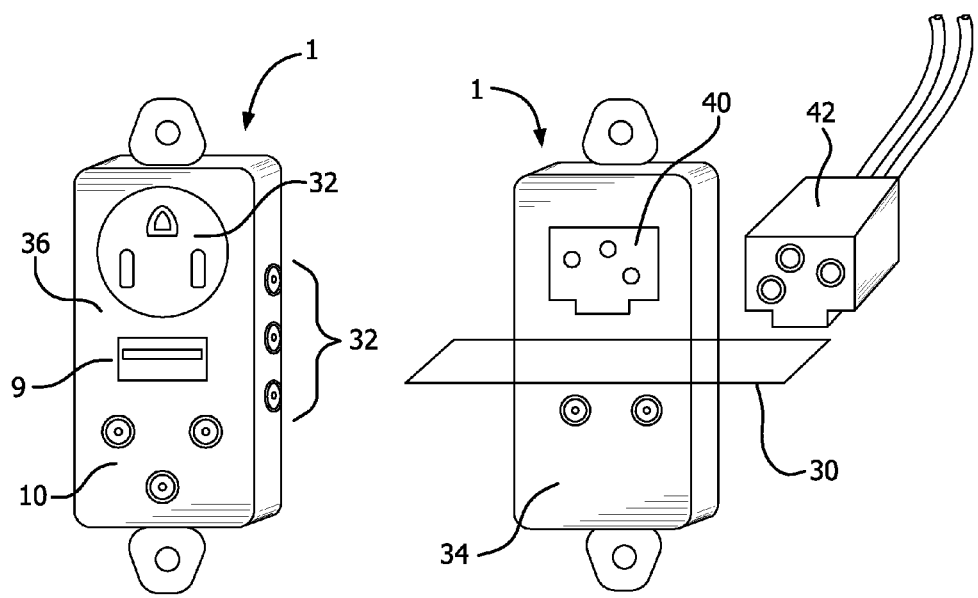
FIG. 3 is a rear perspective view of the AC/DC power module shown in FIG. 1A.

FIG. 2 further illustrates that module 1 combines an AC outlet 32 with an AC/DC converter (not shown) that is preferably installed within the housing internal to the device. An isolation barrier 30 separates the AC line voltage from the low-voltage/data connectors. DC power is sourced through a variety of possible ports, including DC connections 10 in the front, side 32 or rear 34 of the module. DC power can also be delivered through a USB connection 9 in the front face 36 of the module. By combining both AC and DC, the module 1 advantageously eliminates the need for an external adapter, known as a wall-wart. The ability to tap DC power from the front face (visible to users) or from a side or rear connector (hidden, as noted in FIGS. 1a, 2 and 3) provides flexibility for powering an adjacent device in multiple ways as needed and/or as dictated by installation conditions. The presence of the AC outlet on the face is optional. Furthermore, the USB or similar telecommunication connector can be used to configure or monitor the status and parameters of the module. As illustrated in FIG. 3, module 1, is preferably provided with a snap-connect socket 40 to receive a snap-connect plug 42. In this manner, builders such as electricians can provide snap connect plugs to supply AC power where modules will later be installed, and module installers can later simply plug the AC power into the module 1 via the snap-connect plug 42. This makes installation quicker and reduces the possibility of miswiring a module during installation.

FIG. 4 illustrates front and rear views of AV module 2. AV module 2 has on its face VGA 12, S-Video 44, audio 11 and DC 46 connectors, a DC connector 48 on one side, and a rear low voltage DC input 50. Optionally, module 2 includes connectors 52 for a pre-terminated telecom cable 54. FIG. 5 illustrates front and rear views of AV module 6. AV module 6 has on its face S-Video 44 and audio connectors 11. AC power outlet 32 is separated from the low-voltage/data connectors by an isolation barrier 30, and an internal DC power source. Module 6 also includes on its rear face an optional connector 52 for a pre-terminated telecom cable 54, as well as a snap-connect socket 40 for receiving AC power via a snap-connect plug 42. These AV modules are two examples of multimedia modules usable in accordance with exemplary embodiments of the invention, but any suitable combination may be made, as will be discussed below.

As can be appreciated, not all multimedia connectors require sufficient space to occupy a full, that is, single-gang receptacle sized module. Accordingly, embodiments of the present invention comprise partial modules, such as half-size modules, that can be used on combination to assemble desired combinations and configurations. As illustrated in FIG. 6, a first half module 60 and a second half module 62 include interlocking parts 64, 66. The interlocking parts 64, 66 enable the first half module 60 to be physically connected to the second half module 62. Preferably, the interlocking parts 64, 66 also provide an electrical connection between first half module 60 and second half module 62 in order to provide a DC power connection between modules. The interlocking parts may also provide data connections in addition to DC power. Of course, any combination of connectors can be provided on the face of the half-modules, as desired. FIGS. 7A and 7B illustrate examples of half-modules. FIG. 7A illustrates a half-module 70 that includes a VGA port 72, audio connectors 74 and a DC power input 76. This half-module also includes latches 78 for snapping the module 70 into a face plate (not shown). The module 70 may also provide interconnections for connecting communications signals and/or DC power supply between modules on the sides of the module 70 (not shown). FIG. 7B illustrates a half-module 70' that includes a VGA connector 72 and audio connectors 74. Module 70' also includes a rear or side hidden DC power input 79. Module 70' may also include appropriate interlocking parts 64/66 to provide a physical and electrical connection between modules.

FIGS. 8a-8c show exemplary configurations of embodiments of the present invention. FIG. 8a shows two half modules 80, 81 connected physically and electrically via interlocking parts 64, 66 to form a combined module in the size of a single electrical receptacle. Module 80 includes an AC outlet 82 and a DC power connector 84. Module 81 includes a DVI connector 86 and an HDMI connector 88, and optionally receives DC power from module 80. FIG. 8b illustrates a single receptacle size module 83. This module 83 includes a DC power connector 84, a powered USB port 90, an S-Video connector 92 and a 3.5 mm audio connector 94. The modules 80, 82, 83 are shown installed into a double-gang box (not shown) with a face plate 96 including two openings 97, 98. FIG. 8c illustrates two modules 100, 101, snap-fit via latches xx into a faceplate 102. Module 100 includes component video connectors 104, a DC power connector 84, and audio connectors 74. Module 101 includes a VGA connector 72, DC power connector 84, and audio connectors 74.

FIG. 9 illustrates a variety of possible combinations provided in modules according to exemplary embodiments of the invention. Of course, those of ordinary skill in the art will readily appreciate that any suitable connectors may be employed, but the examples shown include USB, RJ45, HDMI, wireless, RGB (component video), L/R audio, 20 A AC power, 15 A AC power, DC power, 3.5 mm audio, SVGA, DVI, S-Video and 110 IDC telecommunication cable connectors.

Additional full-module configurations and their features are shown in FIGS. 10-14 and are described below.

FIGS. 10a and 10b illustrate rear and front perspective views, respectively, of a digital AV display module 200 according to an embodiment of the invention. Display module 200 receives class 2 5V DC power via two wire leads connected to rear input terminals 202. The display module 200 can of course be designed to accept other class 2 power supplies with different voltages, such as 3.3V, 12V or 24V power input depending on power needs and source availability. An IDC termination block 204 at the rear provides a cable connection to a remote module. Various inputs on the front face of the module 200 include, but are not limited to USB 206, HDMI 208 and RS232 210. An infrared sensor 212 receives infrared signals from a remote control device, while indicator lamps 214 show system status. FIG. 10b shows the display module in a decorator frame surround. Display module 200 is preferably connected to a display device, such as for example via the HDMI port 208. FIG. 10c illustrates a source module 220. Source module 220 similarly includes an IDC termination block 204, as well as front face ports for USB 206, HDMI 208 and RS232 210, corresponding to the ports on the display module 200. The source module 220 in FIG. 10b is shown with a snap-in face having latching devices 222. Source module 220 further includes in infrared transmitter 224 to transmit infrared signals. The infrared signals transmitted by infrared transmitter 224 can corresponding to signals received by infrared receiver 212 of the display module 200.

FIGS. 11a-d are front, front perspective, side and rear perspective views of a module 300 according to another embodiment of the invention. show a module powered by AC line voltage. The module 300 includes at least on AC receptacle 302 as well as at least one powered 5V USB charging port 304. The USB charging port 304 is preferably connected to an internal, isolated class 2 power supply. 5V DC leads 306 extend from the rear of the module for powering another 5V device in the same or an adjacent box. 120V line and neutral terminals 308 are provided to connect the AC power supply to the module 300. The module 300 also includes preferably includes a ground terminal 310. A face-mounted switch 312 controls power to the rear DC leads 306 (and/or the USB port 304), whose ON/OFF status is displayed by an LED indicator 314. The line and neutral AC terminals are preferably protected by snap-on covers, as illustrated in FIGS. 11a and 11b. An NEC-compliant internal electrical isolation barrier separates the high voltage AC components from the low voltage DC components. The barrier preferably has knock-out(s) that can be used with fittings to allow the DC supply wires to pass between the two compartments.

FIG. 12 illustrates a first module 1200 and a second module 1202 installed in a single electrical box 1204. 120V AC power is supplied to the module 1200 via wires 1206, 1208, and ground wire 1209. DC power is output from the rear of module 1200 and delivered to module 1202 via a knockout 1210 in an isolation barrier 1211 formed in the electrical box 1204 between module 1200 and module 1202. Module 1202 preferably includes a connector for connection to a class 3 data cable 1212.

FIG. 13 illustrates a first module 1300, connected to a second module 1302 and a third module 1304 in a single electrical box 1305. First module 1300 is substantially similar to the first module 1200 described above. Electrical box 1305 includes a knockout 1310 to permit DC supply wires to pass through an isolation barrier 1311 formed in the electrical box 1305 between first module 1300 and the second and third modules 1302, 1304. Accordingly, a DC power supply of first module 1300 supplies DC power to two other modules 1302, 1304. Each of second and third modules 1302, 1304 preferably include a connector for connection to a class 3 data cable 1212.

FIG. 14 illustrates a first module 1400 connected to a second module 1402 that is not in the same electrical box 1404 as first module 1400. 120V AC power supply wires 1406, 1408 supply power to first module 1400. A DC power supply in module 1400 provides 5V DC power via wires 1410, 1412. A separable DC connector is preferably provided to connect wires 1410, 1412, to wires 1414, 1416 to supply DC to another module such as second module 1402. Wires 1414, 1416 pass through a knockout 1418 in electrical box 1404. Wires 1414, 1416 in turn connect to a rear face of second module 1402 to provide DC power to second module 1402.

FIG. 15 is a block diagram illustrating components of an embodiment of the invention that includes a DC power supply. Module 1500 includes a housing 1501 with AC input terminals 1502 to receive an AC power supply 1503. As illustrated, the AC input terminals 1502 are electrically connected to an optional plug receptacle 1504 on the face 1505 of the module 1500. AC input terminals 1502 are also electrically connected to a DC power supply 1506. The DC power supply receives 110V AC power and transforms the AC input to a 5V DC output. The DC power supply is preferably an AC to class 2 DC power supply. Of course, as can be appreciated, the voltages and characteristics described herein are merely exemplary, and any suitable input or output voltage characteristics could be utilized as needed. The DC power supply 1506 provides DC power to one or more DC outputs 1507. The DC outputs 1507 are connected to DC connectors 1508 provided on the front face 1505, as well as the rear face 1509 of the module 1500, and also may be provided on the side of the module 1500. The DC output 1508 on the rear face 1509 of the module 1500, or on the side of the module 1500, may be used to feed DC power to other modules, either in the same electrical box, or installed remotely. The DC output 1508 on the front face 1505 of the module 1500 may be in the form of a powered USB port, or any other suitable connector.

While exemplary embodiments have been chosen to illustrate the features of the invention, it will be understood by those skilled in the art that various changes, modifications, additions, and substitutions are possible, without departing from the scope and spirit of the invention.

What is claimed is:

1. An electrical module comprising:
    a housing adapted for installation on a flat surface, and having an external portion relative to the surface and an internal portion relative to the surface, the external portion comprising a wall face and the internal portion comprising at least a rear or side face;
    AC power terminals for receiving AC power conductors;
    means for converting input AC power to output DC power;
    an electrical isolation barrier installed in the housing for isolating AC power from DC power;
    at least one AC plug receptacle on the wall face, and at least one DC power output connector on the rear or side face of the housing.

2. The electrical module of claim 1, wherein the housing is adapted for installation in an electrical box.

3. The electrical module of claim 1, wherein the AC power terminals comprise screw terminals or push-in terminals.

4. The electrical module of claim 1, wherein the at least one DC power output comprises a 5V, 12V or 24V power output.

5. The electrical module of claim 1, wherein the means for converting input AC power to output DC power comprises a class 2 power supply.

6. The electrical module of claim 1, further comprising means for switching output DC power on or off.

7. The electrical module of claim 1, wherein the means for switching comprises a switch on the wall face.

8. An electrical module comprising:
    a housing adapted for installation on a flat surface, and having an external portion relative to the surface and an internal portion relative to the surface, the external portion comprising a wall face and the internal portion comprising at least a rear or side face;
    at least one DC power input connector on the side or rear face the housing for receiving DC power supply conductors; and
    at least one multimedia connector on the wall face of the external portion.

9. The electrical module of claim 8, wherein the multimedia connector comprises a form factor for USB, RJ45, HDMI, component video, audio, SVGA, DVI, or S-Video.

10. The electrical module of claim 8, further comprising a DC power input connector on the wall face.

11. The electrical module of claim 8, further comprising means for transferring multimedia signals to another electrical module.

12. An electrical system comprising:
    a first module comprising:
        a first housing;
        AC power terminals accessible outside the housing for receiving AC power supply conductors; and
        means for converting AC power to DC power inside the housing;
    a second module comprising:
        a second housing;
        at least one multimedia connector; and
        a DC power connector for receiving DC power;
    an electrical box; and
    an electrical isolation barrier installed in the electrical box to form a first compartment for receiving the first module and a second compartment for receiving the second module.

13. The electrical module of claim 8, wherein the means for transferring multimedia signals comprises multimedia connectors on the side or rear face of the housing.

14. An electrical system comprising:
    a first housing having a first connector; and
    a second housing having a second connector;

wherein the first and second connectors are of complementary shapes such that the first connector is matable to the second connector to physically and electrically connect the first and second housings, and wherein when the first connector is mated to the second connector, DC power or a multimedia signal is supplied through the mated first and second connectors from the first housing to the second housing; and wherein the combined first and second housings are sized and shaped to fit into an electrical box.

15. The electrical system of claim 12, wherein the first and second module housings are connected, and a knockout is provided to permit a conductor to pass from the first housing to the second housing.

16. The electrical system of claim 12, wherein the knockout is provided in the electrical isolation barrier.

* * * * *